United States Patent [19]
Facq et al.

[11] Patent Number: 5,307,437
[45] Date of Patent: Apr. 26, 1994

[54] OPTICAL FIBRE INCORPORATING A BRAGG LATTICE AND ITS APPLICATION

[75] Inventors: Paul Facq, Panazol; Philippe Di Bin, Limoges; Paul-Hubert Zongo, Couzeix, all of France

[73] Assignee: Gaz de France, Paris, France

[21] Appl. No.: 858,009

[22] Filed: Mar. 26, 1992

[30] Foreign Application Priority Data

Mar. 29, 1991 [FR] France .................. 91 03902

[51] Int. Cl.$^5$ .............................................. G02B 6/02
[52] U.S. Cl. ...................................... 385/124; 385/11; 385/37; 385/12
[58] Field of Search ............... 385/11, 24, 37, 123, 385/12

[56] References Cited

U.S. PATENT DOCUMENTS

| | | | |
|---|---|---|---|
| 4,099,835 | 7/1978 | French et al. | 385/124 |
| 4,618,211 | 10/1986 | Fleury | 350/96.15 |
| 4,787,694 | 11/1988 | Brambley et al. | 385/11 |
| 4,795,233 | 1/1989 | Chang | 385/11 |
| 4,807,950 | 2/1989 | Glenn et al. | 385/123 |
| 4,966,431 | 10/1990 | Heismann | 385/11 |
| 5,016,967 | 5/1991 | Meltz et al. | 385/37 |
| 5,077,816 | 12/1991 | Glomb et al. | 385/37 |

OTHER PUBLICATIONS

G. Meltz, et al., "In-fiber Bragg Grating Tab," *Optical Fiber Communication Conference*, San Francisco, Calif., Jan. 22-26, 1990, vol. 1, p. 24, Optical Society of America.

R. L. Lehman, "Developments in Fiber Optic Sensor Design," *40th Electronic Components & Technology Conference*, Las Vegas, Nevada, May 20-23, 1990, pp. 60-63, IEEE.

A. S. Svakhin, et al., "Narrow-band Bragg Reflecting Filter Based on a Single-mode Fiber," *Soviet Physics Technical Physics*, vol. 32, No. 6, Jun. 1987, pp. 701-702, American Institute of Physics.

G. Meltz, et al, "Formation of Bragg Gratings in Optical Fibers by a Transverse Holographic Method," *Optical Letters*, vol. 14, No. 15, Aug. 1, 1989, pp. 823-825, Optical Society of America.

*Primary Examiner*—Rodney B. Bovernick
*Assistant Examiner*—Stephen W. Barns
*Attorney, Agent, or Firm*—Pollock, Vande Sande & Priddy

[57] ABSTRACT

The invention relates to an optical fibre including, over a part of its length, variations of refractive index disposed in plane, parallel and periodic strata, of period I, which are inclined at an angle $\alpha$ in relation to the axis of the fibre. The normal to the strata forms a non-zero angle with the axis of the fibre. The invention also relates to the application of the invention optical fibre as a selective extractor of flux, a light injector, a coupler, a sensor and a polarizer.

8 Claims, 4 Drawing Sheets

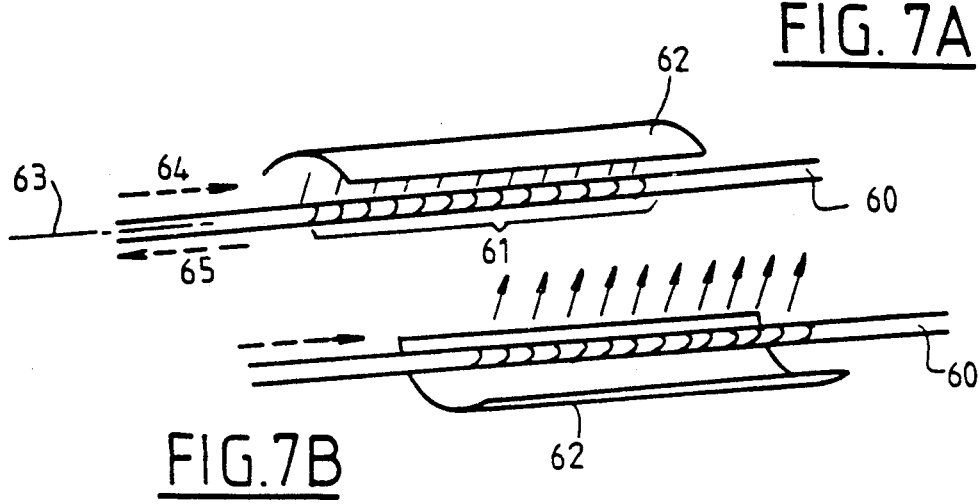
FIG. 7A
FIG. 7B
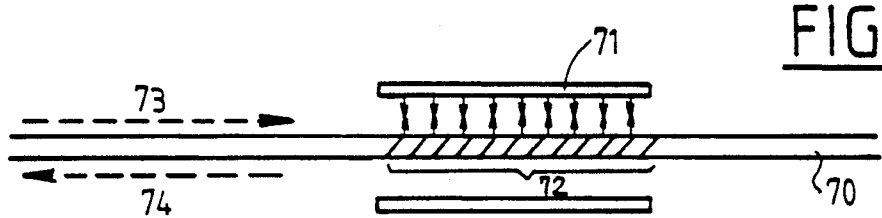
FIG. 8A
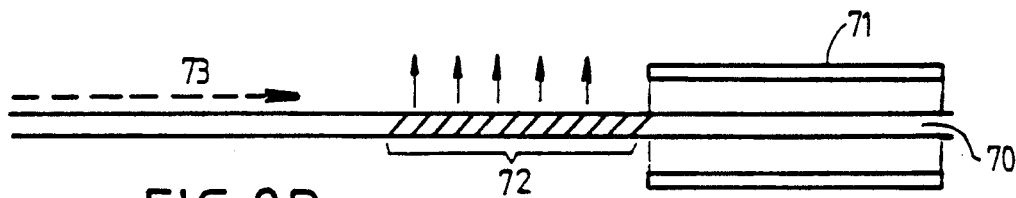
FIG. 8B
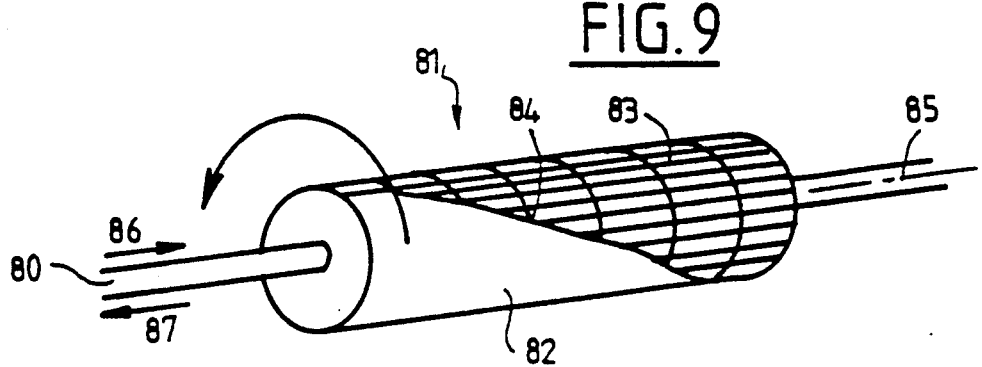
FIG. 9

OPTICAL FIBRE INCORPORATING A BRAGG LATTICE AND ITS APPLICATION

FIELD OF THE INVENTION

The invention relates to an optical device comprising at least one optical fibre having a Bragg lattice or grating and its applications as either selective flux extractor, light injector, fibre optic coupler, fibre-optic sensor or fibre-optic polarizer.

BACKGROUND OF THE INVENTION

In order to avoid any ambiguity the term "optical fibre" is defined to include any light-conducting optical component in the form of a filament comprising a part forming a waveguide and referred to as the "core", at least partially surrounded by a sheath, it being possible for the core to extend coaxially with the sheath or to be offset or out of line, and it being possible for the sections of this core and of this sheath independently to be both circular and parallelepipedal, or of other shapes (for example in the form of a truncated circle, as in the patent U.S. Pat. No. 4,867,522).

In the text which follows, reference will nevertheless essentially be made, for the sake of clarity, to substantially cylindrical optical fibres having a core and a sheath which are both of circular cross-section, extending concentrically, in the axis of the fibre under consideration.

Progress optical fibres and in their applications has given rise to the development of components based on fibres fulfilling the same functions or at least functions which are analogous to those customarily fulfilled by conventional optical components.

Other fibre-optic components are more specific, and it is difficult to find their counterparts in conventional optics.

For this reason, optical fibres having a Bragg lattice have been developed.

Such fibres are described in the American patents U.S. Pat. Nos. 4,725,110, 4,806,012 and 4,807,950.

According to the technique described in these documents, a fibre, of glass or of silica doped with germanium, is treated in such a manner as to constitute within the fibre a Bragg grating which is permanent or definitively modified.

This lattice is composed of plane and parallel strata of constant index. The index varies from one stratum to the next, and its variations are periodic, of period I, the strata accordingly not being in this case ephemeral, and thus not disappearing when the fibre is no longer illuminated.

It is shown, in these documents, that the luminous flux reflected by such as Bragg lattice has characteristics which are a function of its period.

The period is determined by the conditions of manufacture of the Bragg lattice.

In order to be permanent, this Bragg lattice is constructed by subjecting an optical fibre to the interference lattice produced by the intersection of two ultraviolet beams originating, in the particular case concerned, from one and the same source, the high intensity of the light waves applied and their application conditions (wavelength, angles of propagation, etc.) permitting the creation of a fibre core exhibiting a refractive index which is definitively modified by impressing thereon or by etching thereon (at least) one Bragg lattice in strata, almost irreversible periodic perturbations of the refractive index then being formed in the material constituting the core of this fibre.

The various strata of the fibre are subjected to variable illuminations which involve variable modifications of index. As the distribution of the intensity within the interference fringes is sinusoidal, of period I, they produce variations of index of the same period within the fibre.

The period of the Bragg grating is accordingly determined by the conditions of production of the interference (angle, wavelength of the beams, etc.).

It is emphasized, in these documents of the prior art, that the fibres are especially intended to be utilized as a strain gauge.

The object of the present invention is the design of a novel optical component which is simple and capable of very widely varying applications.

SUMMARY OF THE INVENTION

According to the invention, the normal to the strata in question of the fibre will form a non-zero angle with the axis thereof, thus in contrast to the strata of the fibres of the prior art presented hereinabove, in the case of which the normal is parallel to the axis.

Preferably, said strata will in fact be inclined in relation to the axis of the fibre.

According to a preferred embodiment, the fibre will be monomode. Nevertheless, it can also be multimode.

Preferably the (each) fibre will include permanent strata forming the Bragg grating. But said strata could also be temporary or ephemeral, the strata appearing as long as the fibre is illuminated by an optical flux and disappearing when the fiber is no longer illuminated. Optical devices having a fibre with temporary strata are disclosed in U.S. Pat. No. 4,867,522 and in FR-91 03592 (of Mar. 23, 1991), incorporated to the instant disclosure by reference.

The variations of the refractive index of the fibre will preferably be sinusoidal in the direction of its axis.

Furthermore, according to another important feature, the optical device of the invention will preferably comprise an optical system having an inner reflecting surface, advantageously concave or with a convergent action, suitable for surrounding at least partially said fiber, especially where said fibre is provided with said strata. Preferably said reflecting optical system will be cylindrical, the fibre(s) being then advantageously, at their part of its (their) length where it (they) comprise(s) said variations of index, situated at a focus of the optical system.

Such features were until the present time very difficult to obtain. By virtue of them, it will be possible, as a function of the orientation of the strata, to extract or to inject a light flux into the fibre. Furthermore, this will be capable of being utilized for numerous applications.

Moreover, it is for this reason that the subject of the invention is also the application of such an optical fibre especially as a selective extractor of flux at a given wavelength ($\lambda s$), as light injector, as coupler of two optical fibres, each one being of the aforementioned type, as sensor and as polarizer.

In the "coupler" application, said coupler may especially include a cylindrical optical system having an elliptical cross-section, each one of the fibres then being preferably situated, in that part of its length where it includes variations of index, at one of the foci of this optical system.

In another embodiment of such a coupler, the fibres may be in contact with one another in that part of their length where they include variations of refractive index. Furthermore, the angle $\alpha_1$ of inclination of the strata of the first fibre will preferably be equal to the angle $\alpha_2$ of inclination of the strata of the second fibre, the fibres being oriented about their axis in such a manner that the flux emerging from the first fibre enters the second. The sensor will advantageously include a reflecting cylindrical optical system having a circular arc or a circular cross-section, surrounding at least one optical fibre of the aforementioned type.

The relative positions of the optical system and of the fibre will be in each case a function of an external influence at least one of these positions preferably being such that the optical fibre will be situated at the centre of the optical system, in that part of its length where it includes variations of index.

BRIEF DESCRIPTION OF THE DRAWINGS

The invention will be described in detail with reference to the figures, in which:

FIGS. 7A and 7B are the representation of a fibre-optic sensor according to the invention, in a first embodiment.

FIGS. 8A and 8B are a representation of a fibre-optic sensor according to the invention, in a second embodiment.

FIG. 9 is a representation of a sensor according to the invention, in a third embodiment.

DETAILED DESCRIPTION OF THE INVENTION

Figure 1:
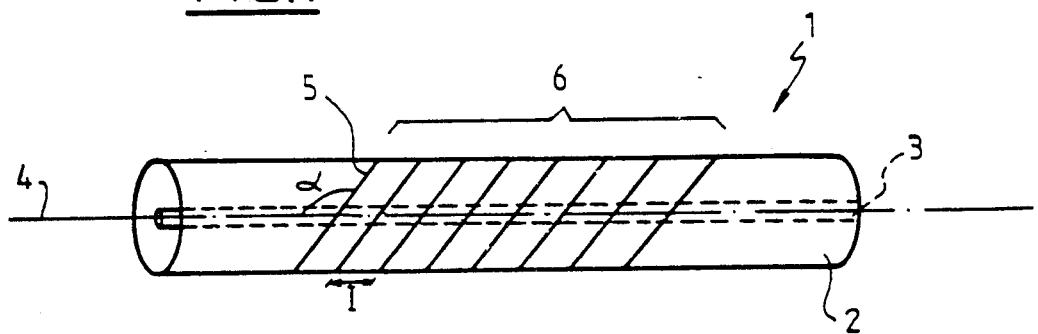
FIG. 1 is a diagrammatic representation of the fibre of the invention.

The subject of the invention concerns an optical fibre 1. Conventionally, the latter has a sheath 2, a core 3, and an axis 4. According to the invention, this optical fibre exhibits variations of refractive index which are disposed in plane, parallel and periodic strata 5, of period I in the direction of the axis. The plane strata 5 are inclined at an angle $\alpha$ in relation to the axis 4 of the fibre. Moreover, they are preferably permanently etched or impressed in the core and/or in the sheath.

Two arrangements may be created.

In the first, the optical fibre 1 includes a Bragg diffraction grating 6, in which the strata are inclined in relation to its axis 4 at an angle different from 90°.

In the second situation, the optical fibre 1 includes a Bragg diffraction grating or lattice 6, in which the strata are parallel to its axis 4, that is to say that the normal to the strata is perpendicular to the axis of the fibre.

In the first situation, this Bragg lattice 6 generates a deflection of an incident luminous flux in a direction inclined in relation to the direction normal to the plane of the strata 5.

Thus, by exploiting this property, difficult to apply in optical fibres, it is possible to extract, or to inject, a luminous flux into a fibre and to exploit this property for the construction of a large number devices or of components.

Figure 2:
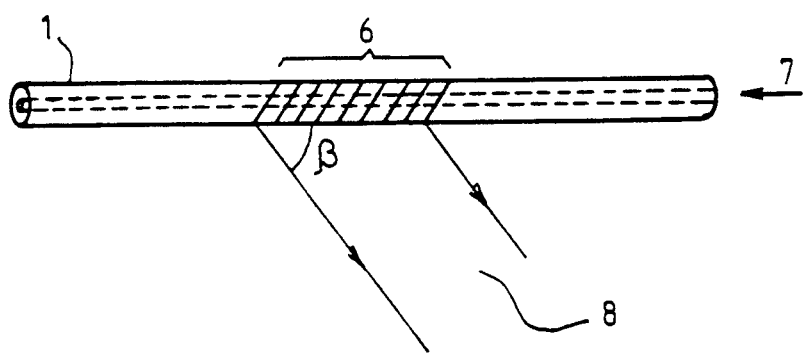
FIG. 2 is the representation of an extractor according to the invention.

As shown in FIG. 2, a luminous flux propagating in the fibre 1 is partially deflected by an angle $\beta$ by reflection on the Bragg lattice 6. When this angle $\beta$ is sufficiently large, that part of the luminous flux which is initially guided by the fibre 1, deflected according to this angle, is extracted from the fibre 1.

Conversely, for the same characteristics of the Bragg lattice 6, a light beam which appears at an angle of incidence $\beta$ at the location of this lattice is coupled into the optical fibre 1.

The Bragg lattice 6 is formed by subjecting an optical fibre, preferably constructed of silica doped with germanium, to a luminous flux at a wavelength situated in the ultraviolet region of the light spectrum, the intensity of which varies in the direction of the axis 4 of the fibre, in a manner analogous to the variations of the target refractive index. This luminous flux is easily obtained by forming, on the fibre 1, interference fringes which are inclined in relation to its axis 4 and of period I. To this end, there is produced on the fibre 1 the interference of two light beams, at the wavelength $\lambda_p$, which are inclined in relation to one another at an angle $2\theta$. It is known that this gives rectilinear interference fringes of inter-fringe spacing $$I = \frac{\lambda_p}{2n\sin\theta}$$

When the Bragg lattice 6 has been formed in the fibre 1, a luminous flux 7 coupled into the optical fibre 1 is partially diffracted by the Bragg lattice 6 and produces a light beam 8 inclined at an angle $\beta$ in relation to the axis of the fibre 1 (FIG. 2).

Figure 3:
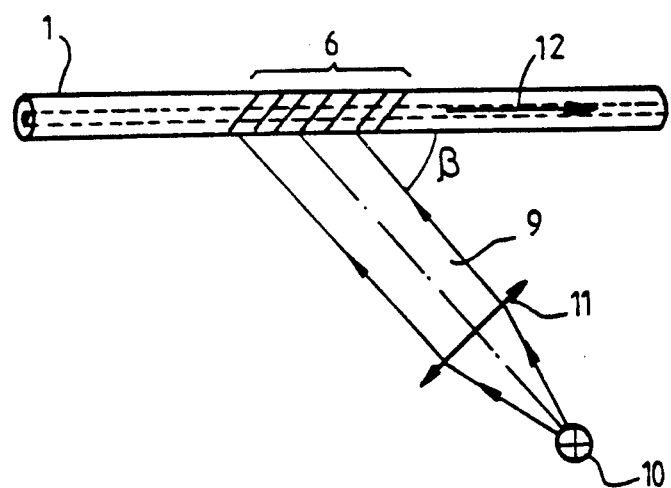
FIG. 3 is the diagrammatic representation of a fibre-optic injector according to the invention.

As shown in FIG. 3, conversely, a parallel light beam 9, produced from a source 10, for example via a collimating lens 11, incident on the Bragg lattice 6 at the angle $\beta$ will produce a luminous flux 12 coupled into the fibre 1.

In both cases, extraction or involving injection, the angle of incidence $\beta$ is linked to the period I of the Bragg lattice 6 and to the wavelength $\lambda_s$ of the signal luminous flux. The chromatic pass band of the device $\Delta\lambda_s$ for a given angle $\beta$ is inversely proportional to the number of strata of the Bragg lattice. Thus, the characteristics of the Bragg lattice can determine, for a given angle $\beta$, $\lambda_s$ and $\Delta\lambda_s$.

By combining extraction and injection, it is possible to construct a fibre-optic coupler at the wavelength $\lambda_s$ including two optical fibres 20, 21 each having a sheath 22 and 23 respectively, a core 24 and 25 respectively and an axis 26 and 27 respectively.

An optical system 28 having an inner reflecting surface, normally concave and adapted for surrounding the fibres, connects said fibres 20 and 21 at least over a part of their length in which they exhibit the Bragg lattices 29 and 30 respectively.

Thus, a luminous flux 31 is guided within the fibre 20 and is at least partially extracted by the Bragg lattice 29 from the fibre 20 at the angle $\beta_1$. The extracted beam, which is taken up by the optical system 28, is incident on the fibre 21, which is the conjugate of the fibre 20 at the angle $\beta_2$. The orientation of the Bragg lattice 30 of the fibre 21 is such that this reflected beam produces the flux 31 which is guided within the fibre 21.

Figure 4:
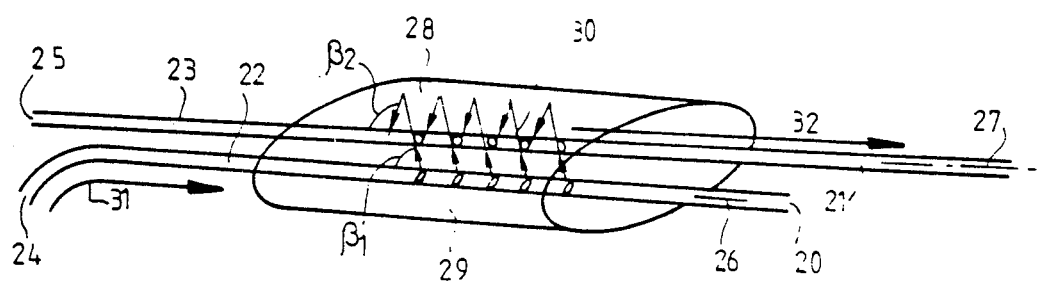
FIG. 4 is the representation of a fibre-optic coupler according to the invention in a first embodiment.

In the embodiment represented in FIG. 4, the optical system 28 is a cylindrical mirror having an ellipsoidal cross-section, the fibres 20 and 21 having their axis 26, 27 coincident with the focal axes of this reflector.

Figure 5:
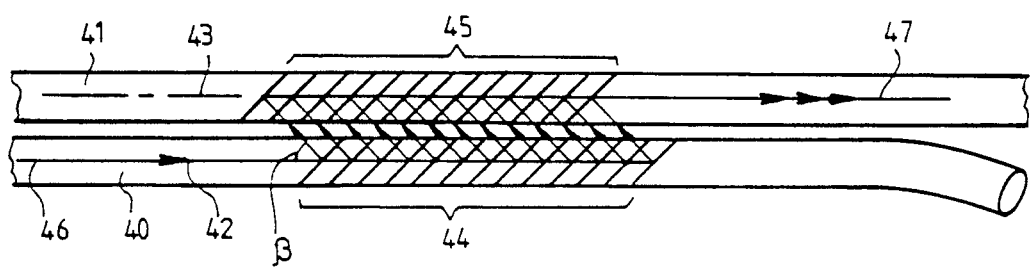
FIG. 5 is the representation of a fibre-optic coupler according to the invention, in a second embodiment.

FIG. 5 shows another embodiment of a coupler with two fibres 40 and 41 respectively. The axes of these fibres 42, 43 are parallel in that part of their length where they each include a Bragg cluster lattice 44 and 45 respectively. The incident flux 46, which is guided within the fibre 40, is partially extracted at the angle $\beta$ by the Bragg lattice 44. Due to the parallelism of the axis of fibres 42, 43, this flux extracted from the fibre 40 is incident on the fibre 41 at the angle $\beta$. The strata of the Bragg lattice 45 of the fibre 41 are parallel to those of the lattice 44 of the fibre 40. Thus, this luminous flux, which is incident on the fibre 41, is guided within the latter, producing the flux 47.

The yield of this coupler, that is to say the ratio between the incident flux 46, which initially coupled to the fibre 40, and the emergent flux 47 coupled, at the exit, to the fibre 41 is improved when the cores of the fibres 40 and 41 are brought close to one another at the location of the Bragg lattices 44 and 45. This may be achieved by partially abrading the sheaths of each one of the fibres 40 and 41 in the zone of the Bragg lattices 44, 45.

Figure 6A:
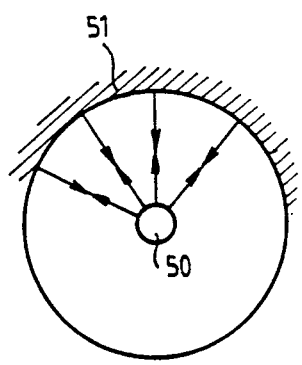
FIGS. 6A and 6B are diagrams illustrating the operation of a fibre according to the invention, placed at the center of a catadioptric optical system.
Figure 6B:
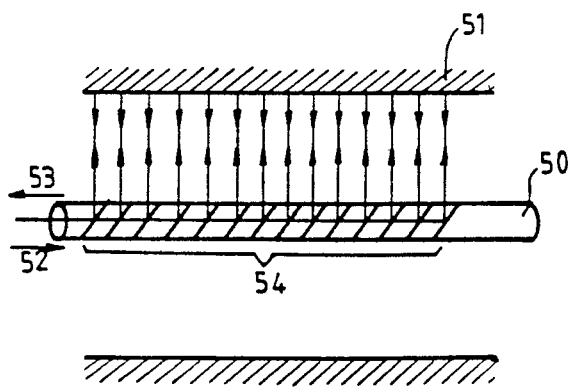

Beneficial effects are produced when a fibre 50 according to the invention is placed at the center of a catadioptric optical system having always an inner reflecting surface 51a and presently being a cylinder with a circular cross-section. In this case, an incident beam 52, which is partially extracted by the Bragg lattice 54, is convergently reflected on itself by t he catadioptric system 51 and produces an emergent flux 53 coupled to the fibre 50, the direction of propagation of which is opposite to that of the incident flux 52. This device may be employed for the construction of numerous sensors. In this type of devices, for example those shown in FIGS. 6, 7 and 8 the reflecting element is advantageously based on microspheres.

The first type of sensor is shown in FIGS. 7A and 7B. The optical fibre 60 including a Bragg lattice 61 is placed at the center of a cylindrical reflector having a cross-section in the form of a circular arc 62. The azimuthal orientation of this reflector about the axis 63 of the fibre 60 is externally controlled between two positions represented in FIG. 7A and in FIG. 7B respectively.

In the position represented in FIG. 7A, the incident luminous flux 64 is partially extracted by the Bragg lattice 61, reflected by the reflector 62 and coupled upon return by the Bragg lattice 61; this gives rise to the back-guided flux 65.

On the other hand, in the position represented in FIG. 7B, the reflector 62 is in a position such that it does not reflect the flux extracted by the Bragg lattice 61.

The remote measurement of the back-reflected flux 65 accordingly permits the establishment of the position of the reflector 62 about the axis 63 and thus permits access to the parameter P which controls this position.

Another sensor is shown in FIGS. 8A and 8B. In this case, the fibre 70 has its axis coincident with a cylindrical mirror having a circular cross-section 71. This cylindrical mirror is capable of being displaced, by an external effect, parallel to its axis. When, as represented in FIG. 8A, the reflector 71 is at the location of the Bragg lattice 72, the incident flux 73, which is partially extracted by the lattice 72, is reflected by the reflector 71 and gives rise to the back-guided flux 74.

On the other hand, as represented in FIG. 8B, the reflector 71 is longitudinally offset in relation to the Bragg lattice 72. The incident flux 73 does not then produce any back-guided flux such as the flux 74.

The remote measurement of the reflected flux 74 permits the establishment of the position of the reflector 71 in relation to the Bragg lattice 72. It is also thus possible to establish intermediate positions of the reflector 71.

FIG. 9 shows a rotational sensor. A fibre 80 including a Bragg lattice is placed on the axis of a cylindrical sleeve 81. This sleeve includes an inner reflecting zone 82 and a non-reflecting zone 83 which are separated by a helix 84. According to the orientation of the sleeve 81 about its axis 85, a larger or smaller part of the Bragg lattice of the fibre 80 sees the reflecting part 82 of the sleeve 81. Thus, the flux 87 reflected by the sleeve 81 is coupled upon return to the fibre 80 from the incident flux 86 and is dependent upon the orientation of the sleeve 81 about its axis. The position of the sleeve 81 is externally controlled.

Figure 10:
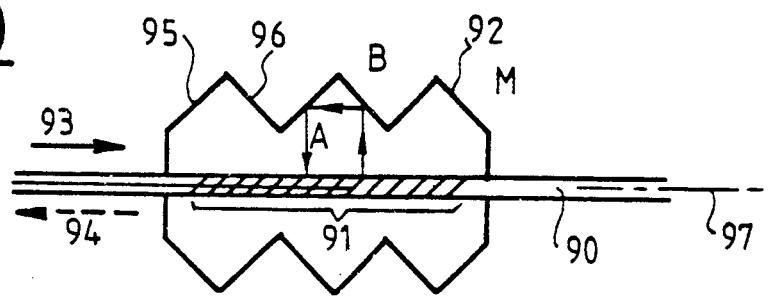
FIG. 10 is the representation of a fibre-optic sensor according to the invention, in a fourth embodiment.

FIG. 10 shows a sensor constructed by placing a fibre 90 including a Bragg lattice 91 on the axis of a sleeve 92. This cylindrical sleeve is a catadioptric system composed of a rotary mirror, having the same axis as the fibre. It is created by the rotation of a line broken down into sections at right angles, the elements of which are inclined at 45° in relation to the axis.

It may be constituted by a block of transparent material, pierced by a cylindrical channel receiving the fibre; in the latter case, an index liquid is advantageously employed in order to ensure the continuity of index between the fibre and the block of material. The reflection on its faces is obtained by the effect of a metallic or dielectric deposit or by total reflection.

It may also be hollow and covered with metallic or dielectric reflective layers.

The incident beam 93, coupled into the fibre 90, is partially extracted by the Bragg lattice 91 and then again coupled into this fibre after reflection on the sleeve 92. It is thus possible, by remotely measuring the reflected flux 94, to gain access either to the position of the sleeve 92 in relation to the Bragg lattice 91 or to its angular position about its axis when its surfaces is partially reflected.

Figure 11:
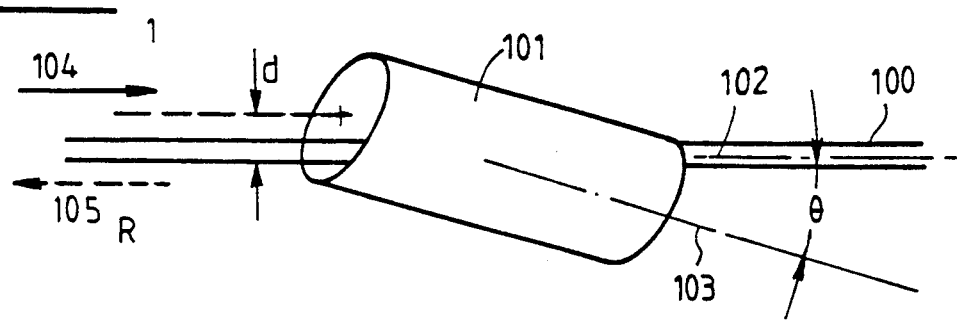
FIG. 11 is the representation of a fibre-optic sensor according to the invention, in a fifth embodiment.

The sensor represented in FIG. 11 is an all-or-nothing sensor. It is composed of a fibre 100 surrounded by a reflective cylinder 101. The relative positions of the axis 102 of the optical fibre 100, in relation to the axis 103 of the cylinder 101 is externally controlled. In one of the positions, referred to as active positions, these axes 102 and 103 respectively are coincident. On the other hand, in the non-active position these axes are different.

The incident flux 104 coupled to the optical fibre 100 is reflected by the cylinder 101 when it is in the active position and generates the reflected flux 105 which is also coupled to the fibre 100. On the other hand, in the non-active position the flux 104 produces upon return, in the fibre, only a reflected flux 105 which is very small in relation to the incident flux 104.

The position of the reflective cylinder 101 is externally controlled.

An important benefit of the fibres incorporating a Bragg lattice according to the invention is that the Bragg lattices 6 can be determined so as to take off only a part of the incident flux coupled to the optical fibre 1. It is thus possible to place on one and the same fibre a large number of sensors which are recognized in relation to one another either by the wavelength $\lambda_s$ on which they act or by their distance in relation to the measuring centre.

Figure 12:
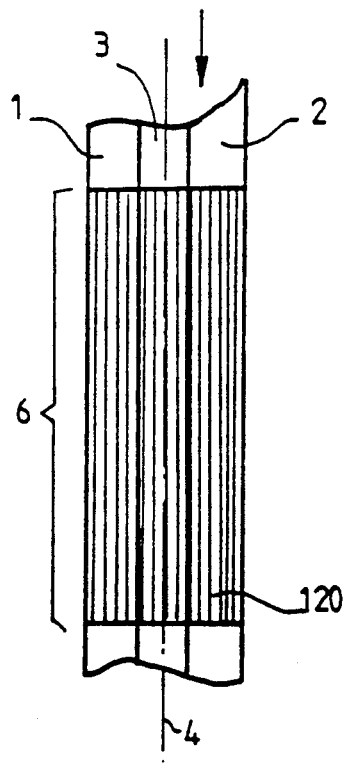
FIG. 12 is the representation of a fibre-optic polarizer according to the invention.

In the second situation represented in FIG. 12, the strata 120 are parallel to the axis 4 of the fibre 1. These strata have a polarising effect on the signal wave guided by the fibre.

Finally, it will be understood that in an alternative embodiment, the optical system with its inner reflecting surface could possibly be located directly against the sheath of the fibres, for example by means of a metallization or a plating with metal of the external surface of said sheath.

We claim:

1. An optical sensor comprising:
    an optical fiber having a sheath extending along an axis of the fiber and an axially extending interior core;
    an axial section of the fiber having variations of refractive index disposed in strata which are parallel to one another and periodic;
    a normal to the strata forming a non-zero angle with the axis of the fiber;
    the strata being inclined in relation to said axis;
    an optical reflecting system having an inner reflecting surface adapted for at least partially surrounding the fiber, said optical system and said fiber being adapted for having different possible relative positions;
    the reflecting optical system having a section in the form of at least a circular arc;
    one of said relative positions between said optical system and said fiber corresponding to a position where the optical fiber is located, in that axial section where it has variations of refractive index, at the center of the optical system, for reflecting towards an axial end of the fiber a luminous flux injected at the axial end, a portion of the luminous flux deflected by the strata and reflected back to said fiber by the inner reflection surface of the optical system.

2. The device set forth in claim 1 wherein the optical system is a sleeve placed about the optical fiber and longitudinally movable along the axis thereof.

3. The device set forth in claim 2 wherein the sleeve has a circular cross-section.

4. Device according to claim 2 in which the sleeve is of circular cross-section with a generatrix in the form of a line broken down into sections forming a succession of catadioptric elements.

5. Device according to claim 1, in which said optical system is a cylindrical mirror having a cross-section in the form of the circular arc which is moveable in rotation about the axis of said optical fibre.

6. Device according to claim 1, in which the optical system is a partial cylindrical mirror located between a generatrix and a helix.

7. An optical device comprising:
    two optical fibers, each having a sheath extending along an axis of the fiber and an axially extending interior core;
    an axial section of each fiber having variations of refractive index disposed in strata which are parallel to one another and periodic;
    a normal to the strata forming a non-zero angle with the axis of each fiber;
    the strata being inclined in relation to said axis;
    the angle of inclination of the strata of said two fibers being substantially equal;
    the fibers positioned in spaced adjacent relation for allowing a luminous flux injected at an axial end of one of the fibers, and deviated by the strata, to enter the other fiber; and
    an optical reflecting system having an inner reflecting surface adapted for at least partially surrounding the fibers, especially where the fibers are provided with the strata;
    the reflecting optical system having an ellipsoidal section; and wherein
    each of the fibers has its section of refractive index variations positioned at one of the foci of the optical system.

8. The device set forth in claim 7 wherein the two fibers contact one another along their sections having refractive index variations, the sheaths of each fiber being partially exposed, along the sections in contact, for positioning their respective cores more closely together.

* * * * *